H. A. KIEST.
FISHING REEL.
APPLICATION FILED SEPT. 1, 1920.

1,385,457.

Patented July 26, 1921.
2 SHEETS—SHEET 1.

Inventor
H. A. Kiest

By D. Swift
Attorney

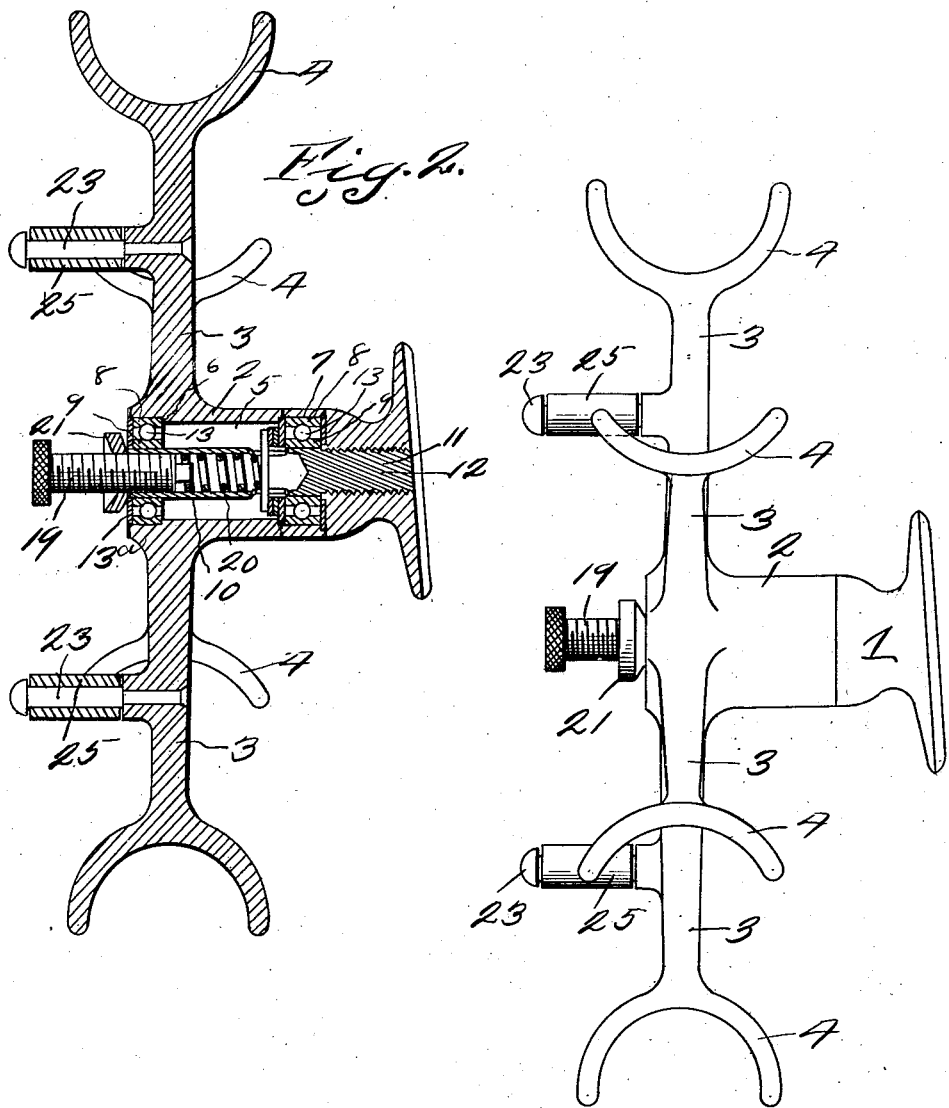

UNITED STATES PATENT OFFICE.

HENRY A. KIEST, OF KNOX, INDIANA.

FISHING-REEL.

1,385,457.  Specification of Letters Patent.  Patented July 26, 1921.

Application filed September 1, 1920. Serial No. 407,452.

*To all whom it may concern:*

Be it known that I, HENRY A. KIEST, a citizen of the United States, residing at Knox, in the county of Starke, State of Indiana, have invented a new and useful Fishing-Reel; and I do hereby declare the following to be a full, clear, and exact description of the invention, such as will enable others skilled in the art to which it appertains to make and use the same.

The invention relates to fishing reels and has for its object to provide a fishing reel of light construction so as to obviate as much of the weight as possible and to form the reel of radially disposed arms having at their ends transversely disposed U-shaped members which U-shaped members receive the line as it is wound on the reel.

A further object is to provide an adjustable disk clutch in the hub of the reel and so constructed that the friction of the clutch may be varied as desired or if so desired the clutch may be locked, thereby preventing rotation of the reel.

A further object is to provide supporting ball bearings for the reel, said ball bearings being located in the hub of the wheel.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Fig. 2 is a vertical sectional view taken on line 2—2 of Fig. 1.

Fig. 3 is a side elevation of the reel.

Figure 4:
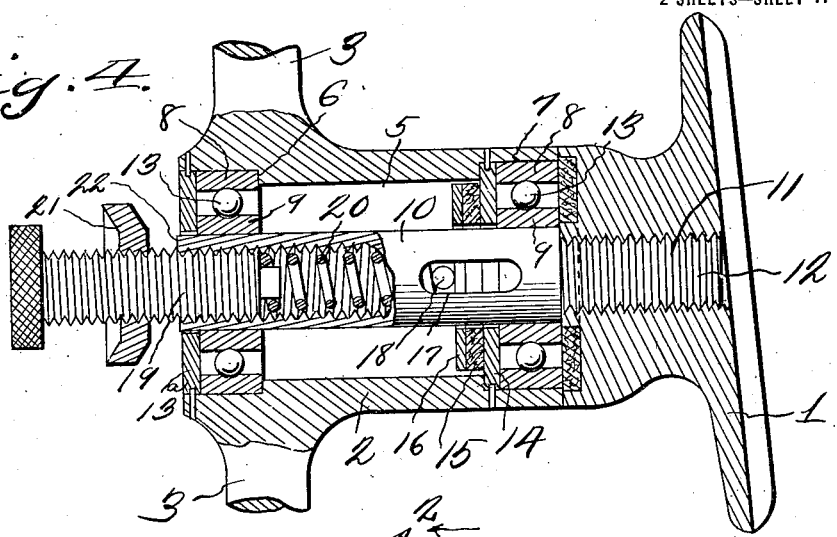
Fig. 4 is an enlarged section through the hub, taken at right angles to the section shown in Fig. 2.
Figure 1:
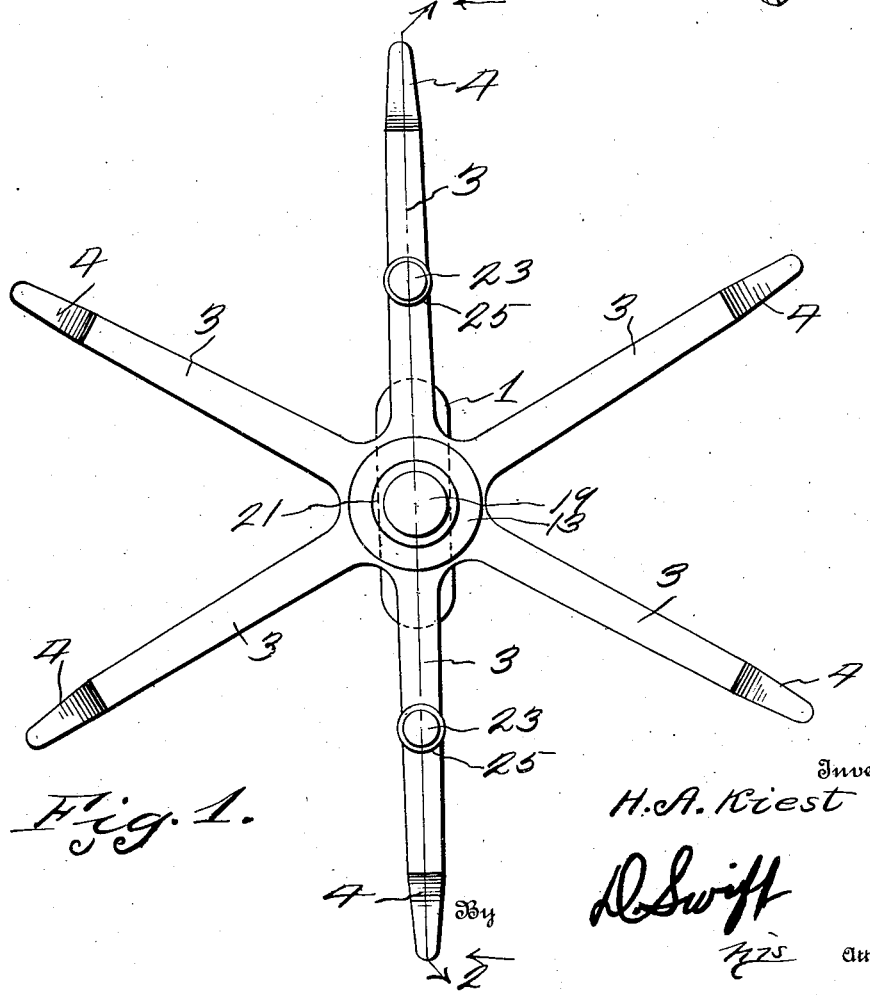
Figure 1 is a front elevation of the reel.

Referring to the drawings, the numeral 1 designates the reel seat which is preferably made of aluminum for purposes of lightness and 2, the spider hub which is provided with radially extending arms 3, the outer ends of which are provided with transversely disposed U-shaped members 4, on which the line is reeled. The spider hub is preferably made of aluminum so as to reduce its weight, the weight being additionally reduced by using the arms 3 and the U-shaped members 4, thereby giving the maximum winding circumference with the minimum weight. The spider hub 2 is provided with a cylindrical bore 5, the ends of which are counterbored as at 6 and 7 for the reception of the ball bearing ring 8, which ball bearing ring frictionally engages the counterbores. The rings 9 are frictionally held on the hollow portion 10 of the spindle 11, the end 12 of which is threaded into the reel seat 1. Ball bearings 13 are disposed between the rings 8 and 9 and form ball bearing supports on which the spider hub 2 is rotatably mounted. Disposed in the counterbore 6 and secured therein so as to rotate with the spider hub 2 is a cover plate 13ª, which cover plate prevents the entrance of foreign matter, such as dirt into the ball bearings and interior of the hub. The hollow portion 10 of the spindle 11 is interiorly threaded and extends slightly beyond the outer face of the cover plate 13ª, the purpose of which will presently appear. Disposed in the counterbore 7 is a friction disk 14, said friction disk being provided with a centrally disposed aperture through which the hollow portion 10 of the spindle 11 passes. The hollow portion 10 of the spindle 11 also passes through apertures of a felt washer 15 and of a tension washer 16, which washers when forced together form clutch means in combination with the friction disk 14 carried by and rotatable with spider hub 2. The hollow portion 10 of the spindle 11 is provided with diametrically arranged elongated slots 17 through which slots the ends of the tensioning pin 18 engage the tensioning washer 16 as clearly shown in Fig. 2. Interposed between the tensioning pin 18 and the end of the tensioning screw 19 is a spiral spring 20, by means of which spring and the tensioning screw the frictional engagement of the tensioning pin may be varied for varying the clutching action of the felt washer 15 with the frictional disk 14 thereby allowing complete control of the reel during a reeling or unreeling operation, also allowing the friction to be adjusted according to the desire of the user. It is obvious that if it is so desired the tensioning screw may be so adjusted that the spider hub will be held against rotation. Tensioning screw 19 has threaded thereon a lock nut 21, which lock nut when so desired may be screwed into engagement with the end 22 of the hollow sleeve 10, thereby locking the tensioning screw against displacement.

From the above it will be seen that a fishing reel is provided which is of light construction and one wherein the maximum reeling circumference is provided. When the reel is made of a light material, such as aluminum, it is obvious that the weight is reduced to a minimum.

Extending outwardly from oppositely disposed arms 3 are handle pins 23, on which handle pins finger engaging rotatable members 25 are pivoted, thereby providing means which may be grasped by the operator when it is desired to rotate the reel.

The invention having been set forth what is claimed as new and useful is:—

1. A fishing reel comprising a reel seat, a reel spindle carried by said reel seat, a reel having a hub member mounted on ball bearings interposed between the interior of the hub and the spindle, a friction disk carried by the hub and surrounding the spindle, friction disks disposed within the hub and surrounding the spindle and in engagement with the first mentioned friction disk, said spindle being hollow and interiorly threaded, diametrically disposed elongated slots in said hollow spindle for the reception of a transversely disposed pin, said pin having its end in engagement with the friction disk, a tensioning screw threaded in the hollow spindle and a spring interposed between the transversely disposed pin and the end of the tensioning screw, said tensioning screw forming means for varying the friction between the friction disks.

2. A fishing reel comprising a reel seat, a hollow interiorly threaded spindle carried by said reel seat, a reel hub surrounding the spindle and mounted on ball bearings interposed between the spindle and the interior of the hub, a reeling spider carrier by the hub, a friction disk carried by the hub and surrounding the hollow spindle, friction disks surrounding the spindle and disposed within the hub, a pin extending through the hollow spindle transversely and disposed in longitudinally disposed slots, the ends of said pin being in engagement with the fricton disks surrounding the spindle, a spring disposed within the hollow spindle and in engagement with said pin, a tensioning screw threaded in the hollow spindle and having its inner end in engagement with the tensioning spring and a lock nut carried by the tensioning screw and adapted to engage the end of a hollow spindle whereby said tensioning screw may be locked against displacement.

3. A fishing reel comprising a reel seat, a hollow interiorly threaded spindle threaded in said reel seat, a reel hub surrounding the spindle and mounted on ball bearings interposed between the spindle and counterbores of the hub, a friction disk detachably secured to the hub for surrounding the hollow spindle, friction disks surrounding the spindle and disposed within the hub, a pin extending through the hollow portion of the spindle transversely and having its ends extending through longitudinally disposed slots in the hollow spindle, the ends of said pin being in engagement with the friction disk surrounding the spindle, a spring disposed wthin the threaded portion of the hollow spindle, an adjusting screw threaded in the spindle, said springs having one of its ends in engagement with the adjusting screw and its other end in engagement with the pin, said adjusting screw forming means whereby the frictional engagement of the disk may be varied, and a lock nut threaded on the adjusting screw and adapted to engage the end of the hollow threaded spindle for locking the adjusting screw against movement.

In testimony whereof I have signed my name to this specification in the presence of two subscribing witnesses.

HENRY A. KIEST.

Witnesses:
 JOHN EDWARDS,
 JAMES STARR.